(12) United States Patent
Qasimi et al.

(10) Patent No.: US 8,656,772 B2
(45) Date of Patent: Feb. 25, 2014

(54) FLOW SENSOR WITH PRESSURE OUTPUT SIGNAL

(75) Inventors: Mohammed Abdul Javvad Qasimi, Hilliard, OH (US); William Hoover, Plain City, OH (US); Richard Charles Sorenson, Columbus, OH (US); Craig Scott Becke, South Vienna, OH (US)

(73) Assignee: Honeywell International Inc., Morristown, NJ (US)

( * ) Notice: Subject to any disclaimer, the term of this patent is extended or adjusted under 35 U.S.C. 154(b) by 301 days.

(21) Appl. No.: 13/273,473

(22) Filed: Oct. 14, 2011

(65) Prior Publication Data

US 2012/0035866 A1 Feb. 9, 2012

Related U.S. Application Data

(63) Continuation-in-part of application No. 12/729,145, filed on Mar. 22, 2010, now Pat. No. 8,397,586.

(51) Int. Cl.
*G01F 1/68* (2006.01)

(52) U.S. Cl.
USPC .................................................. 73/204.21

(58) Field of Classification Search
USPC ............. 73/861.02, 204.11, 204.17, 202.5, 73/204.21
See application file for complete search history.

(56) References Cited

U.S. PATENT DOCUMENTS

| | | |
|---|---|---|
| 2,746,296 A | 5/1956 | Stover |
| 3,216,249 A | 11/1965 | Joel |
| 3,410,287 A | 11/1968 | Van Der Heyden et al. |
| 3,433,069 A | 3/1969 | Trageser |
| 3,484,732 A | 12/1969 | Postma |
| 3,559,482 A | 2/1971 | Baker et al. |
| 3,640,277 A | 2/1972 | Adelberg |
| 3,785,206 A | 1/1974 | Benson et al. |
| 3,830,104 A | 8/1974 | Gau |
| 3,838,598 A | 10/1974 | Tompkins |
| 3,886,799 A | 6/1975 | Billette et al. |
| 3,895,531 A | 7/1975 | Lambert |

(Continued)

FOREIGN PATENT DOCUMENTS

| | | |
|---|---|---|
| DE | 3905746 | 8/1990 |
| DE | 102004019521 | 11/2005 |

(Continued)

OTHER PUBLICATIONS

"Schematic Cross-Section for AWM43600," 1 page, prior to Jan. 31, 2011.

(Continued)

*Primary Examiner* — Jewel V Thompson
(74) *Attorney, Agent, or Firm* — Seager Tufte & Wickhem LLC (57) ABSTRACT

This disclosure relates generally to flow sensors, and more particularly, to flow sensors that include a pressure related output signal. In one example, a flow sensor assembly may include a housing with an inlet flow port, an outlet flow port and a fluid channel extending therebetween, with a flow sensing element positioned in the housing and exposed to the fluid channel. A filter insert may be situated in the fluid channel, sometimes upstream of the flow sensor. When so configured, the flow sensor assembly may output a pressure or differential pressure based, at least in part, on a value of the flow rate through the fluid channel as sensed by the flow sensor.

20 Claims, 7 Drawing Sheets

(56) References Cited

U.S. PATENT DOCUMENTS

| | | | |
|---|---|---|---|
| 3,931,736 A | 1/1976 | Olmstead |
| 3,952,577 A | 4/1976 | Hayes et al. |
| 3,970,841 A | 7/1976 | Green |
| 3,981,074 A | 9/1976 | Yamamoto et al. |
| 4,008,619 A | 2/1977 | Alcaide et al. |
| 4,030,357 A | 6/1977 | Wemyss |
| 4,041,757 A | 8/1977 | Baker et al. |
| 4,098,133 A | 7/1978 | Frische et al. |
| 4,100,801 A | 7/1978 | LeMay |
| 4,326,214 A | 4/1982 | Trueblood |
| 4,343,194 A | 8/1982 | Dehart et al. |
| 4,411,292 A | 10/1983 | Schiller |
| 4,418,723 A | 12/1983 | Koni et al. |
| 4,444,060 A | 4/1984 | Yamamoto |
| RE31,570 E | 5/1984 | Drexel |
| 4,478,076 A | 10/1984 | Bohrer |
| 4,478,077 A | 10/1984 | Bohrer et al. |
| 4,481,828 A | 11/1984 | Cheng |
| 4,494,405 A | 1/1985 | Oosuga et al. |
| 4,501,144 A | 2/1985 | Higashi et al. |
| 4,546,655 A | 10/1985 | Victor |
| 4,574,640 A | 3/1986 | Krechmery |
| 4,581,928 A | 4/1986 | Johnson |
| 4,581,945 A | 4/1986 | Rusz |
| 4,618,397 A | 10/1986 | Shimizu et al. |
| 4,648,270 A | 3/1987 | Johnson et al. |
| 4,651,564 A | 3/1987 | Johnson et al. |
| 4,653,321 A | 3/1987 | Cunningham et al. |
| 4,655,088 A | 4/1987 | Adams |
| 4,668,102 A | 5/1987 | Mott |
| 4,672,997 A | 6/1987 | Landis et al. |
| 4,677,850 A | 7/1987 | Miura et al. |
| 4,677,858 A | 7/1987 | Ohnhaus |
| 4,683,159 A | 7/1987 | Bohrer et al. |
| 4,691,566 A | 9/1987 | Aine |
| 4,696,194 A | 9/1987 | Taylor |
| 4,768,386 A | 9/1988 | Taddeo |
| 4,790,181 A | 12/1988 | Aine |
| 4,800,754 A | 1/1989 | Korpi |
| 4,817,022 A | 3/1989 | Jornod et al. |
| 4,825,704 A | 5/1989 | Aoshima et al. |
| 4,829,818 A | 5/1989 | Bohrer |
| 4,839,038 A | 6/1989 | Mclain, II |
| 4,845,649 A | 7/1989 | Eckardt et al. |
| 4,856,328 A | 8/1989 | Johnson |
| 4,900,242 A | 2/1990 | Maus et al. |
| 4,945,762 A | 8/1990 | Adamic, Jr. |
| 4,961,344 A | 10/1990 | Rodder |
| 4,975,679 A * | 12/1990 | Ballyns .......................... 340/442 |
| 4,976,283 A | 12/1990 | Wildfang et al. |
| 4,986,127 A | 1/1991 | Shimada et al. |
| 5,000,478 A | 3/1991 | Kerastas |
| 5,014,552 A | 5/1991 | Kamiunten et al. |
| 5,042,307 A | 8/1991 | Kato |
| 5,050,429 A | 9/1991 | Nishimoto et al. |
| 5,063,786 A | 11/1991 | Sanderson et al. |
| 5,063,787 A | 11/1991 | Khuzai et al. |
| 5,081,866 A | 1/1992 | Ochiai et al. |
| 5,088,329 A | 2/1992 | Sahagen |
| 5,088,332 A | 2/1992 | Merilainen et al. |
| 5,089,979 A | 2/1992 | McEachern et al. |
| 5,099,965 A | 3/1992 | Lehnert et al. |
| 5,107,441 A | 4/1992 | Decker |
| 5,137,026 A | 8/1992 | Waterson et al. |
| 5,144,843 A | 9/1992 | Tamura et al. |
| 5,155,061 A | 10/1992 | O'Connor et al. |
| 5,161,410 A | 11/1992 | Davey et al. |
| 5,187,985 A | 2/1993 | Nelson |
| 5,193,393 A | 3/1993 | Czarnocki |
| 5,220,830 A | 6/1993 | Bonne |
| 5,231,877 A | 8/1993 | Henderson |
| 5,249,462 A | 10/1993 | Bonne |
| 5,253,517 A | 10/1993 | Molin et al. |
| 5,295,394 A | 3/1994 | Suzuki |
| 5,303,584 A | 4/1994 | Ogasawara et al. |
| 5,319,973 A | 6/1994 | Crayton et al. |
| 5,321,638 A | 6/1994 | Witney |
| 5,332,005 A | 7/1994 | Baan |
| 5,341,841 A | 8/1994 | Schaefer |
| 5,341,848 A | 8/1994 | Laws |
| 5,357,793 A | 10/1994 | Jouwsma |
| 5,377,128 A | 12/1994 | McBean |
| 5,379,650 A | 1/1995 | Kofoed et al. |
| 5,385,046 A | 1/1995 | Yamakawa et al. |
| 5,398,194 A | 3/1995 | Brosh et al. |
| 5,400,973 A | 3/1995 | Cohen |
| 5,404,753 A | 4/1995 | Hecht et al. |
| 5,453,628 A | 9/1995 | Hartsell et al. |
| 5,459,351 A | 10/1995 | Bender |
| 5,460,050 A | 10/1995 | Miyano |
| 5,481,925 A | 1/1996 | Woodbury |
| 5,507,171 A | 4/1996 | Mattes et al. |
| 5,528,452 A | 6/1996 | Ko |
| 5,535,135 A | 7/1996 | Bush et al. |
| 5,535,633 A | 7/1996 | Kofoed et al. |
| 5,537,870 A | 7/1996 | Zurek et al. |
| 5,544,529 A | 8/1996 | Mitani et al. |
| 5,551,304 A | 9/1996 | Baskett |
| 5,578,962 A | 11/1996 | Rastegar |
| 5,581,027 A | 12/1996 | Juntunen |
| 5,583,295 A | 12/1996 | Nagase et al. |
| 5,585,311 A | 12/1996 | Ko |
| 5,609,303 A | 3/1997 | Cohen |
| 5,634,592 A | 6/1997 | Campau |
| 5,641,911 A | 6/1997 | Ryhanen |
| 5,672,832 A | 9/1997 | Cucci et al. |
| 5,717,145 A | 2/1998 | Yasuhara et al. |
| 5,735,267 A | 4/1998 | Tobia |
| 5,736,651 A | 4/1998 | Bowers |
| 5,741,968 A | 4/1998 | Arai |
| 5,747,705 A | 5/1998 | Herb et al. |
| 5,750,892 A | 5/1998 | Huang et al. |
| 5,763,787 A | 6/1998 | Gravel et al. |
| 5,770,883 A | 6/1998 | Mizuno et al. |
| 5,781,291 A | 7/1998 | So et al. |
| 5,789,660 A | 8/1998 | Kofoed et al. |
| 5,792,958 A | 8/1998 | Speldrich |
| 5,808,210 A | 9/1998 | Herb et al. |
| 5,817,950 A | 10/1998 | Wiklund et al. |
| 5,829,685 A | 11/1998 | Cohen |
| 5,844,135 A | 12/1998 | Brammer et al. |
| 5,861,561 A | 1/1999 | Van Cleve et al. |
| 5,866,824 A | 2/1999 | Schieber |
| 5,870,482 A | 2/1999 | Loeppert et al. |
| 5,942,694 A | 8/1999 | Robins et al. |
| 6,023,978 A | 2/2000 | Dauenhauer et al. |
| 6,035,721 A | 3/2000 | Krisch |
| 6,044,716 A | 4/2000 | Yamamoto |
| 6,047,244 A | 4/2000 | Rud, Jr. |
| 6,112,598 A | 9/2000 | Tenerz et al. |
| 6,119,730 A | 9/2000 | McMillan |
| 6,128,963 A | 10/2000 | Bromster |
| 6,131,463 A | 10/2000 | Morris |
| 6,142,014 A | 11/2000 | Rilling |
| 6,150,681 A | 11/2000 | Allen |
| 6,164,143 A | 12/2000 | Evans |
| 6,167,763 B1 | 1/2001 | Tenerz et al. |
| 6,169,965 B1 | 1/2001 | Kubisiak et al. |
| 6,177,637 B1 | 1/2001 | Evans |
| 6,223,593 B1 | 5/2001 | Kubisiak et al. |
| 6,229,190 B1 | 5/2001 | Bryzek et al. |
| 6,234,016 B1 | 5/2001 | Bonne et al. |
| 6,247,495 B1 | 6/2001 | Yamamoto et al. |
| 6,263,740 B1 | 7/2001 | Sridhar et al. |
| 6,308,553 B1 | 10/2001 | Bonne et al. |
| 6,312,389 B1 | 11/2001 | Kofoed et al. |
| 6,322,247 B1 | 11/2001 | Bonne et al. |
| 6,445,053 B1 | 9/2002 | Cho |
| 6,450,005 B1 | 9/2002 | Bentley |
| 6,452,427 B1 | 9/2002 | Ko et al. |
| 6,502,459 B1 | 1/2003 | Bonne et al. |
| 6,526,822 B1 | 3/2003 | Maeda et al. |
| 6,527,385 B2 | 3/2003 | Koitabashi et al. |
| 6,528,340 B2 | 3/2003 | Haji-Sheikh et al. |

(56) References Cited

U.S. PATENT DOCUMENTS

| | | |
|---|---|---|
| 6,542,594 B1 | 4/2003 | LeBoulzec |
| 6,543,449 B1 | 4/2003 | Woodring et al. |
| 6,553,808 B2 | 4/2003 | Bonne et al. |
| 6,557,409 B2 | 5/2003 | Setescak |
| 6,561,021 B2 | 5/2003 | Uramachi et al. |
| 6,579,087 B1 | 6/2003 | Vrolijk |
| 6,591,674 B2 | 7/2003 | Gehman et al. |
| 6,615,668 B2 | 9/2003 | Toyoda et al. |
| 6,621,138 B1 | 9/2003 | Alter |
| 6,642,594 B2 | 11/2003 | Kurtz |
| 6,647,776 B2 | 11/2003 | Kohmura et al. |
| 6,653,959 B1 | 11/2003 | Song |
| 6,655,207 B1 | 12/2003 | Speldrich et al. |
| 6,681,623 B2 | 1/2004 | Bonne et al. |
| 6,684,711 B2 | 2/2004 | Wang |
| 6,715,339 B2 | 4/2004 | Bonne et al. |
| 6,724,202 B2 | 4/2004 | Tanizawa |
| 6,742,399 B2 | 6/2004 | Kunz et al. |
| 6,761,165 B2 | 7/2004 | Strickland, Jr. |
| 6,769,299 B2 | 8/2004 | Forster et al. |
| 6,779,393 B1 | 8/2004 | Muller et al. |
| 6,779,395 B2 | 8/2004 | Hornung et al. |
| 6,826,966 B1 | 12/2004 | Karbassi et al. |
| 6,871,534 B1 | 3/2005 | Hamada et al. |
| 6,871,535 B2 | 3/2005 | Blakley et al. |
| 6,871,537 B1 | 3/2005 | Gehman et al. |
| 6,886,401 B2 | 5/2005 | Ito et al. |
| 6,901,795 B2 | 6/2005 | Naguib et al. |
| 6,904,799 B2 | 6/2005 | Cohen et al. |
| 6,904,907 B2 | 6/2005 | Speldrich et al. |
| 6,907,787 B2 | 6/2005 | Cook et al. |
| 6,915,682 B2 | 7/2005 | Renninger et al. |
| 6,923,069 B1 | 8/2005 | Stewart |
| 6,928,865 B2 | 8/2005 | Ito et al. |
| 6,945,118 B2 | 9/2005 | Maitland, Jr. et al. |
| 6,957,586 B2 | 10/2005 | Sprague |
| 6,958,523 B2 | 10/2005 | Babcock et al. |
| 7,000,298 B2 | 2/2006 | Cook et al. |
| 7,000,612 B2 | 2/2006 | Jafari et al. |
| 7,024,937 B2 | 4/2006 | James |
| 7,028,560 B2 | 4/2006 | Castillon Levano |
| 7,032,463 B2 | 4/2006 | Misholi et al. |
| 7,036,366 B2 | 5/2006 | Emmert et al. |
| 7,043,978 B2 | 5/2006 | Goka et al. |
| 7,059,184 B2 | 6/2006 | Kanouda et al. |
| 7,085,628 B2 | 8/2006 | Ohmi et al. |
| 7,100,454 B2 | 9/2006 | Hasunuma |
| 7,107,834 B2 | 9/2006 | Meneghini et al. |
| 7,117,747 B2 | 10/2006 | Borzabadi et al. |
| 7,121,139 B2 | 10/2006 | Shajii et al. |
| 7,146,860 B2 | 12/2006 | Yeh et al. |
| 7,146,864 B2 | 12/2006 | Sullivan et al. |
| 7,185,538 B2 | 3/2007 | Hager et al. |
| 7,204,139 B2 | 4/2007 | Takayama |
| 7,218,093 B2 | 5/2007 | Cirkel et al. |
| 7,239,957 B1 | 7/2007 | Sweet et al. |
| 7,243,541 B1 | 7/2007 | Bey et al. |
| 7,258,003 B2 | 8/2007 | Padmanabhan et al. |
| 7,258,016 B2 | 8/2007 | Maitland, Jr. et al. |
| 7,262,724 B2 | 8/2007 | Hughes et al. |
| 7,263,876 B2 | 9/2007 | Yamazaki et al. |
| 7,266,999 B2 | 9/2007 | Ricks |
| 7,278,309 B2 | 10/2007 | Dmytriw et al. |
| 7,278,326 B2 | 10/2007 | Kobayashi et al. |
| 7,305,877 B2 | 12/2007 | Beyrich et al. |
| 7,318,351 B2 | 1/2008 | Cobianu et al. |
| 7,337,677 B2 | 3/2008 | Mizohata |
| 7,343,812 B2 | 3/2008 | Stewart et al. |
| 7,343,823 B2 | 3/2008 | Speldrich |
| 7,347,098 B2 | 3/2008 | Kurt et al. |
| 7,347,785 B2 | 3/2008 | Worman, Jr. et al. |
| 7,353,719 B2 | 4/2008 | Hiura et al. |
| 7,373,819 B2 | 5/2008 | Engler et al. |
| 7,377,177 B1 | 5/2008 | Lamb et al. |
| 7,386,166 B2 | 6/2008 | Curry et al. |
| 7,430,918 B2 | 10/2008 | Selvan et al. |
| 7,454,984 B1 | 11/2008 | Ross et al. |
| 7,458,274 B2 | 12/2008 | Lamb et al. |
| 7,464,611 B2 | 12/2008 | Matter et al. |
| 7,469,598 B2 | 12/2008 | Shkarlet et al. |
| 7,472,580 B2 | 1/2009 | Lyons et al. |
| 7,479,255 B2 | 1/2009 | Otani et al. |
| 7,493,823 B2 | 2/2009 | Stewart et al. |
| 7,509,855 B2 | 3/2009 | Garvin |
| 7,513,149 B1 | 4/2009 | Ricks |
| 7,516,761 B2 | 4/2009 | Setescak |
| 7,520,051 B2 | 4/2009 | Becke et al. |
| 7,530,274 B2 | 5/2009 | Kurtz et al. |
| 7,549,332 B2 | 6/2009 | Yamashita et al. |
| 7,568,383 B2 | 8/2009 | Colvin et al. |
| 7,603,898 B2 | 10/2009 | Speldrich |
| 7,631,562 B1 | 12/2009 | Speldrich |
| 7,635,077 B2 | 12/2009 | Schubert |
| 7,647,835 B2 | 1/2010 | Speldrich |
| 7,653,494 B2 | 1/2010 | Neacsu et al. |
| 7,654,157 B2 | 2/2010 | Speldrich |
| 7,661,303 B2 | 2/2010 | Kohno et al. |
| 7,685,874 B2 | 3/2010 | Nakano et al. |
| 7,698,938 B2 | 4/2010 | Inagaki et al. |
| 7,698,958 B2 | 4/2010 | Matter et al. |
| 7,704,774 B2 | 4/2010 | Mayer et al. |
| 7,730,793 B2 | 6/2010 | Speldrich |
| 7,752,929 B2 * | 7/2010 | Kurz ................................ 73/863 |
| 7,757,553 B2 | 7/2010 | Meier et al. |
| 7,759,945 B2 | 7/2010 | Wade |
| 7,762,138 B2 | 7/2010 | Zdeblick et al. |
| 7,769,557 B2 | 8/2010 | Bey et al. |
| 7,775,105 B2 | 8/2010 | Khadkikar et al. |
| 7,793,410 B2 | 9/2010 | Padmanabhan et al. |
| 7,805,986 B2 | 10/2010 | Colvin et al. |
| 7,823,456 B2 | 11/2010 | Krog et al. |
| 7,832,269 B2 | 11/2010 | Bey, Jr. et al. |
| 7,878,980 B2 | 2/2011 | Ricciardelli |
| 7,891,238 B2 | 2/2011 | Becke et al. |
| 7,892,488 B2 | 2/2011 | Speldrich et al. |
| 7,918,136 B2 | 4/2011 | Muchow et al. |
| 7,924,189 B2 | 4/2011 | Sayers |
| 7,950,286 B2 | 5/2011 | Bentley |
| 7,995,124 B2 | 8/2011 | Dai |
| 8,010,322 B2 | 8/2011 | Dmytriw et al. |
| 8,024,146 B2 | 9/2011 | Bey et al. |
| 8,113,046 B2 * | 2/2012 | Speldrich et al. .......... 73/204.22 |
| 8,158,438 B2 | 4/2012 | Leiner et al. |
| 8,175,835 B2 | 5/2012 | Dmytriw et al. |
| 8,286,504 B2 * | 10/2012 | Weckstrom ................ 73/861.52 |
| 8,397,586 B2 | 3/2013 | Sorenson et al. |
| 8,485,031 B2 * | 7/2013 | Speldrich et al. .......... 73/204.22 |
| 2002/0078744 A1 | 6/2002 | Gehman et al. |
| 2003/0062045 A1 | 4/2003 | Woodring et al. |
| 2004/0118200 A1 | 6/2004 | Hornung et al. |
| 2004/0163461 A1 | 8/2004 | Ito et al. |
| 2004/0177703 A1 | 9/2004 | Schumacher et al. |
| 2005/0016534 A1 | 1/2005 | Ost |
| 2005/0039809 A1 | 2/2005 | Speldrich |
| 2005/0235757 A1 | 10/2005 | De Jonge et al. |
| 2005/0247106 A1 | 11/2005 | Speldrich et al. |
| 2005/0247107 A1 | 11/2005 | Speldrich et al. |
| 2006/0017207 A1 | 1/2006 | Bechtold et al. |
| 2006/0101908 A1 | 5/2006 | Meneghini et al. |
| 2006/0201247 A1 | 9/2006 | Speldrich et al. |
| 2006/0225488 A1 | 10/2006 | Speldrich |
| 2007/0000330 A1 | 1/2007 | Tysoe et al. |
| 2007/0171589 A1 | 7/2007 | Otake |
| 2007/0176010 A1 | 8/2007 | Figi et al. |
| 2007/0197922 A1 | 8/2007 | Bradley et al. |
| 2007/0238215 A1 | 10/2007 | Stewart et al. |
| 2007/0295068 A1 | 12/2007 | Kozawa et al. |
| 2008/0163683 A1 | 7/2008 | Becke et al. |
| 2008/0202929 A1 | 8/2008 | Chapples et al. |
| 2009/0067684 A1 | 3/2009 | Mainguet |
| 2009/0188303 A1 | 7/2009 | Ooishi |
| 2009/0265144 A1 | 10/2009 | Speldrich |
| 2010/0013165 A1 | 1/2010 | Speldrich et al. |
| 2010/0101332 A1 | 4/2010 | Speldrich |

(56) References Cited

U.S. PATENT DOCUMENTS

| | | | |
|---|---|---|---|
| 2010/0154559 A1 | 6/2010 | Speldrich | |
| 2010/0269583 A1 | 10/2010 | Jasnie | |
| 2010/0305465 A1 | 12/2010 | Ricks et al. | |
| 2011/0061368 A1* | 3/2011 | Miyata et al. | 60/277 |
| 2011/0179879 A1 | 7/2011 | Bentley | |
| 2011/0226052 A1* | 9/2011 | Speldrich et al. | 73/204.22 |
| 2011/0226053 A1 | 9/2011 | Sorenson et al. | |
| 2011/0247411 A1 | 10/2011 | Speldrich | |
| 2012/0125114 A1 | 5/2012 | Stewart et al. | |
| 2012/0186336 A1* | 7/2012 | Speldrich et al. | 73/201 |

FOREIGN PATENT DOCUMENTS

| | | |
|---|---|---|
| EP | 0094497 | 11/1983 |
| EP | 0255056 | 2/1988 |
| EP | 0857957 | 8/1998 |
| EP | 1655123 | 5/2006 |
| EP | 1691175 A1 | 8/2006 |
| EP | 1959242 | 8/2008 |
| EP | 2068129 | 10/2009 |
| EP | 2157411 | 2/2010 |
| EP | 2199758 | 6/2010 |
| EP | 2270441 A2 | 1/2011 |
| FR | 377743 | 3/1907 |
| GB | 2123564 | 2/1984 |
| JP | 49120131 | 11/1974 |
| JP | 57115873 | 7/1982 |
| JP | 58221119 | 12/1983 |
| JP | 63065679 | 3/1988 |
| JP | 63215929 | 9/1988 |
| JP | 3099230 | 4/1991 |
| JP | 4069521 A | 3/1992 |
| JP | 7083713 | 3/1995 |
| JP | 10239130 A | 9/1998 |
| JP | 10307047 | 11/1998 |
| JP | 2004012406 | 1/2004 |
| JP | 2004304052 | 10/2004 |
| JP | 2006197538 | 7/2006 |
| WO | 9221940 | 12/1992 |
| WO | 9315373 | 8/1993 |
| WO | 9517651 | 6/1995 |
| WO | 0111322 | 2/2001 |
| WO | 0161282 | 8/2001 |
| WO | 0198736 | 12/2001 |
| WO | 2006131531 | 12/2006 |
| WO | 2007095528 | 8/2007 |
| WO | 2007137978 | 12/2007 |
| WO | 2008070603 | 6/2008 |

OTHER PUBLICATIONS

Bodycote, "Competitive Teardown Analysis of Sensirion EMI," Bodycote Testing Group, 24 pages, Oct. 15, 2007.
Bodycote, "Honeywell Sensing and Control, Sensiron SDP610 Competitive Teardown Analysis," 15 pages, Feb. 19, 2009.
U.S. Appl. No. 13/018,017, filed Jan. 31, 2011.
U.S. Appl. No. 13/018,037, filed Jan. 31, 2011.
Honeywell, "Airflow Sensors Line Guide," 6 pages, Apr. 2010.
Honeywell, "Airflow Sensors Line Guide," 6 pages, Nov. 2010.
Honeywell, "Airflow, Force and Pressure Sensors," Product Range Guide, 20 pages, Mar. 2011.
Honeywell, "Airflow, Force, and Pressure Sensors," Product Range Guide, 20 pages, Apr. 2010.
Honeywell, "AWM43600V, Issue No. 4," 1 page, Jul. 29, 1996.
Honeywell, "AWM43600V, Part No. SS12177," 1 page, Jul. 10, 1998.
Honeywell, "Housing, Flowtube, Drawing 50005182," 1 page, Sep. 2, 2004.
Honeywell, "Housing, Plastic, Drawing 050.1.156," 1 page, Jul. 8, 1998.
Honeywell, "Housing, Subassembly, Drawing SS-12148," 1 page, Oct. 14, 1998.
Honeywell, "Mass Airflow Sensors, AWM720P1 Airflow," 4 pages, prior to Mar. 22, 2010.
Honeywell, "Mass Airflow Sensors, AWM9000 Airflow," 6 pages, 2003.
Honeywell, "Reference and Application Data, Microbridge Airflow Sensors," 1 page, prior to Mar. 22, 2010.
Honeywell, "Sensing and Control Interactive Catalog," 4 pages, prior to Mar. 22, 2010.
Honeywell, "Tubing, Plastic, Drawing SS-12062," 1 page, Apr. 5, 1999.
Honeywell, "Tubing, Plastic, Drawing SS-12160," 1 page, drawn Jan. 28, 1998.
U.S. Appl. No. 13/361,764, filed Jan. 30, 2012.
All Sensors, "BDS Series Pressure Sensor," 4 pages, prior to Sep. 6, 2011.
Bitko et al., "Improving the MEMS Pressure Sensor," Sensors, pp. 1-12, Jul. 2000.
Celerity, Inc., "Dual Range Transducer Display," 2 pages, 2006.
Search Report for EP Application Serial No. 09178993.3 dated Dec. 16, 2011.
Search Report for EP Application Serial No. 11190426.4 dated Aug. 5, 2012.
Search Report for EP Application Serial No. 12153191.7 dated Jun. 6, 2012.
Search Report for GB Application Serial No. 1103997.1, date of search Jul. 11, 2011.
U.S. Appl. No. 13/673,685, filed Nov. 9, 2012.
U.S. Appl. No. 13/863,188, filed Apr. 15, 2013.
Honeywell, "DCXL-DS Series, SURSENSE Ultra Low Silicon Pressure Sensors," 4 pages, May 2010.
Martel Electronics, "PPC-3300 Precision Dual Range Pressure Calibrator," 2 pages, 2002.
Schultz, "Interfacing Semiconductor Pressure Sensors to Microcomputers," Freescale Semiconductor, AN1318 Rev 2, 12 pages, May 2005.
Silicon Microstructures Inc., "Low Pressure Transducer Fully Temperature Compensated and Calibrated Dual In-Line Package," SM5651-SM5652 Low Pressure Constant Current/Voltage Dip, 2 pages, 2001-2002.
Zentrum Mikroelektronik Dresden AG, "ZMD31050/ZMD31150 Advanced Sensor Signal Conditioner," Application Notes, Electronic Offset Compensation, Rev. 1.01, 4 pages, Apr. 13, 2010.
Zentrum Mikroelektronik Dresden AG, "ZSC31050 Advanced Differential Sensor Signal Conditioner," Functional Description, Rev. 1.08, 50 pages, Jul. 29, 2010.

* cited by examiner

FLOW SENSOR WITH PRESSURE OUTPUT SIGNAL

RELATED APPLICATION

This application is a continuation-in-part of U.S. patent application Ser. No. 12/729,145, filed on Mar. 22, 2010, and entitled "FLOW SENSOR ASSEMBLY WITH POROUS INSERT", which is incorporated herein by reference.

FIELD

The present disclosure relates generally to flow sensors.

BACKGROUND

Flow sensors are commonly used to sense the flow rate of a fluid (e.g. gas or liquid) traveling through a fluid channel. Such flow sensors can be used in a wide variety of applications including, for example, medical applications, flight control applications, industrial process applications, combustion control applications, weather monitoring applications, as well as many other applications. Such flow sensors typically provide an electrical output signal that is indicative of the flow rate of the fluid in the fluid channel.

SUMMARY

This disclosure relates generally to flow sensors, and more particularly, to flow sensors that include a pressure related output signal. In one illustrative but non-limiting example, a flow sensor assembly may include a housing with an inlet flow port, an outlet flow port, and a fluid channel extending between the inlet flow port and the outlet flow port. A flow sensor may be in communication with the fluid channel, and may sense a measure related to the fluid flow rate of the fluid traveling through the fluid channel.

A filter insert may be inserted in the fluid channel. In some instances, the filter insert may be upstream of the flow sensor or downstream of the flow sensor. In some instances, a first filter insert may be situated upstream of the flow sensor, and a second filter insert may be situated downstream of the flow sensor. During operation, a fluid may pass through the inlet flow port, across the flow sensor, and through the outlet flow port. The fluid may also pass through one or more filter inserts. The one or more filter inserts may produce a pressure drop between the inlet flow port and the outlet flow port. In some instances, the one or more filter inserts may be configured to provide a predetermined pressure drop at a given flow rate of fluid, over at least a predefined range of flow rates.

In some instances, the flow sensor assembly may sense a measure related to a flow rate of the fluid flowing through the fluid channel in the housing, and in some cases, may output the measure related to the fluid flowing through the fluid channel. Alternatively, or in addition, the flow sensor assembly may output a measure related to a pressure and/or pressure drop along the fluid channel that is caused by the fluid flowing through the fluid channel. The measure related to the pressure and/or pressure drop in the fluid channel may be at least partially based on the measure related to the flow rate in the fluid channel as measured by the flow sensor.

In some instances, a fluid flow characteristic (e.g., acoustic impedance) of the filter insert may be chosen so that the measure related to the flow rate and the measure related to the pressure and/or pressure drop are linearly or substantially linearly related. A substantially linear relationship may make it easier for a processing element to compute the measure related to the pressure and/or pressure drop from the measure related to the flow rate as sensed by the flow sensor of the flow sensor assembly. While a filter insert that produces a substantially linear relationship between the measure related to the flow rate and the measure related to the pressure over at least a predefined range of flow rates may be desirable in some applications, it is contemplated that a filter insert that produces a non-linear relationship between the measure related to the flow rate and the measure related to the pressure over at least a predefined range of flow rates may be used, if desired.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION

The disclosure may be more completely understood in consideration of the following detailed description of various illustrative embodiments of the disclosure in connection with the accompanying drawings, in which.

While the disclosure is amenable to various modifications and alternative forms, specifics thereof have been shown by way of example in the drawings and will be described in detail. It should be understood, however, that the intention is not to limit aspects of the disclosure to the particular embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to be illustrative of the claimed disclosure.

Figure 1:
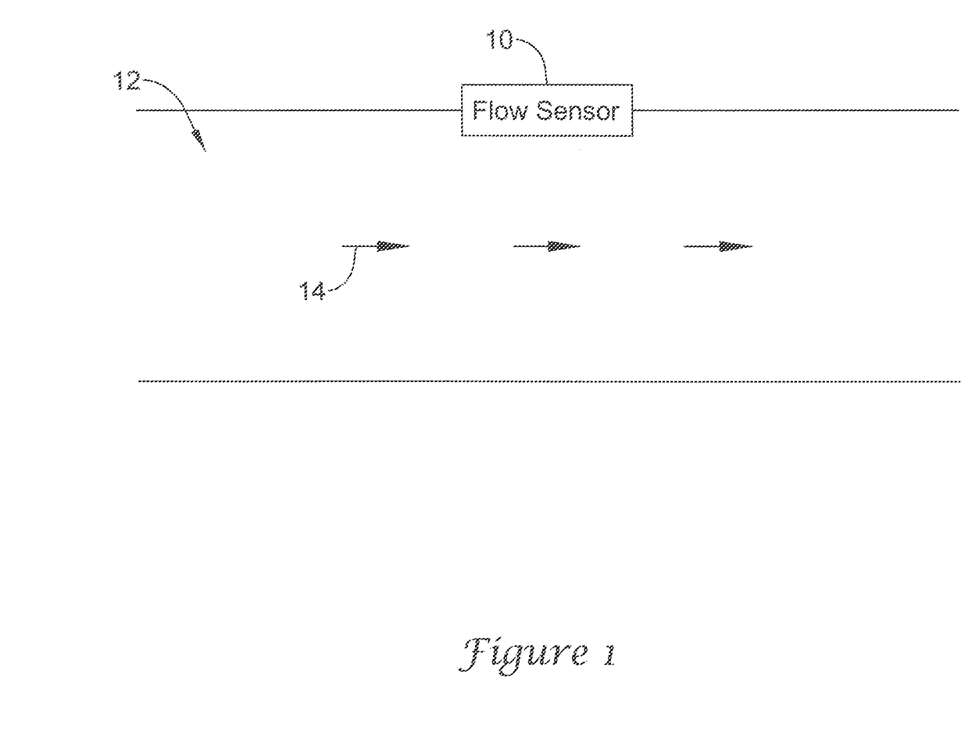
FIG. 1 is a schematic diagram of an illustrative flow sensor for measuring a fluid flow rate of a fluid passing through a fluid channel.

In one illustrative embodiment, FIG. 1 depicts a schematic diagram of an illustrative flow sensor 10 for measuring a fluid flow rate of a fluid flow 14 passing through a fluid channel 12 over a defined or undefined range of flow rates. The term "fluid" as used herein may refer to a gas and/or a liquid, depending on the application. In the illustrative embodiment, the flow sensor 10 may be in communication with the fluid channel 12, and in some cases, may be exposed to and/or disposed in the fluid channel 12, and may measure one or more properties of or caused by fluid flow 14. For example, flow sensor 10 may measure the mass flow and/or velocity of fluid flow 14 using one or more thermal sensors (e.g. see FIG. 2), flow sensors, acoustical sensors, optical sensors, pitot tubes, and/or any other suitable sensor or sensor combination, as desired. In some cases, the flow sensor 10 may be a microbridge or a Microbrick™ sensor assembly available from the assignee of the present application, but this is not required. Some illustrative methods and sensor configurations that are considered suitable for measuring the mass flow and/or velocity of the fluid flow 14 are disclosed in, for example, U.S. Pat. Nos. 4,478,076; 4,478,077; 4,501,144; 4,581,928; 4,651,564; 4,683,159; 5,050,429; 6,169,965; 6,223,593; 6,234,016; 6,502,459; 7,278,309; 7,513,149; and 7,647,842. It is contemplated that flow sensor 10 may include any of these flow sensor configurations and methods, as desired. It must be recognized, however, that flow sensor 10 may be any suitable flow sensor, as desired.

In the illustrative examples herein, fluid channel 12 may experience a range of flow rates of fluid flow 14. For example, fluid channel 12 may include a high-volume fluid flow, a mid-volume fluid flow, or a low-volume fluid flow. Example fluid flow applications may include, but are not limited to, respirometers, flow meters, velocimeters, flight control, industrial process stream, combustion control, weather monitoring, as well as any other suitable fluid flow applications, as desired. Flow sensor 10 may be configured to sense flow rates at least over a defined or predefined range of flow rates moving through fluid flow path or fluid channel 12, where defined ranges of flow rates may optionally include, but are not limited to, ranges of 0-100 sccm (standard cubic centimeters per minute), 0-200 sccm, 0-1,000 sccm, 1,001-5,000 sccm, 5,001-10,000 sccm or other similar or different flow rate ranges, as desired.

Figure 2:
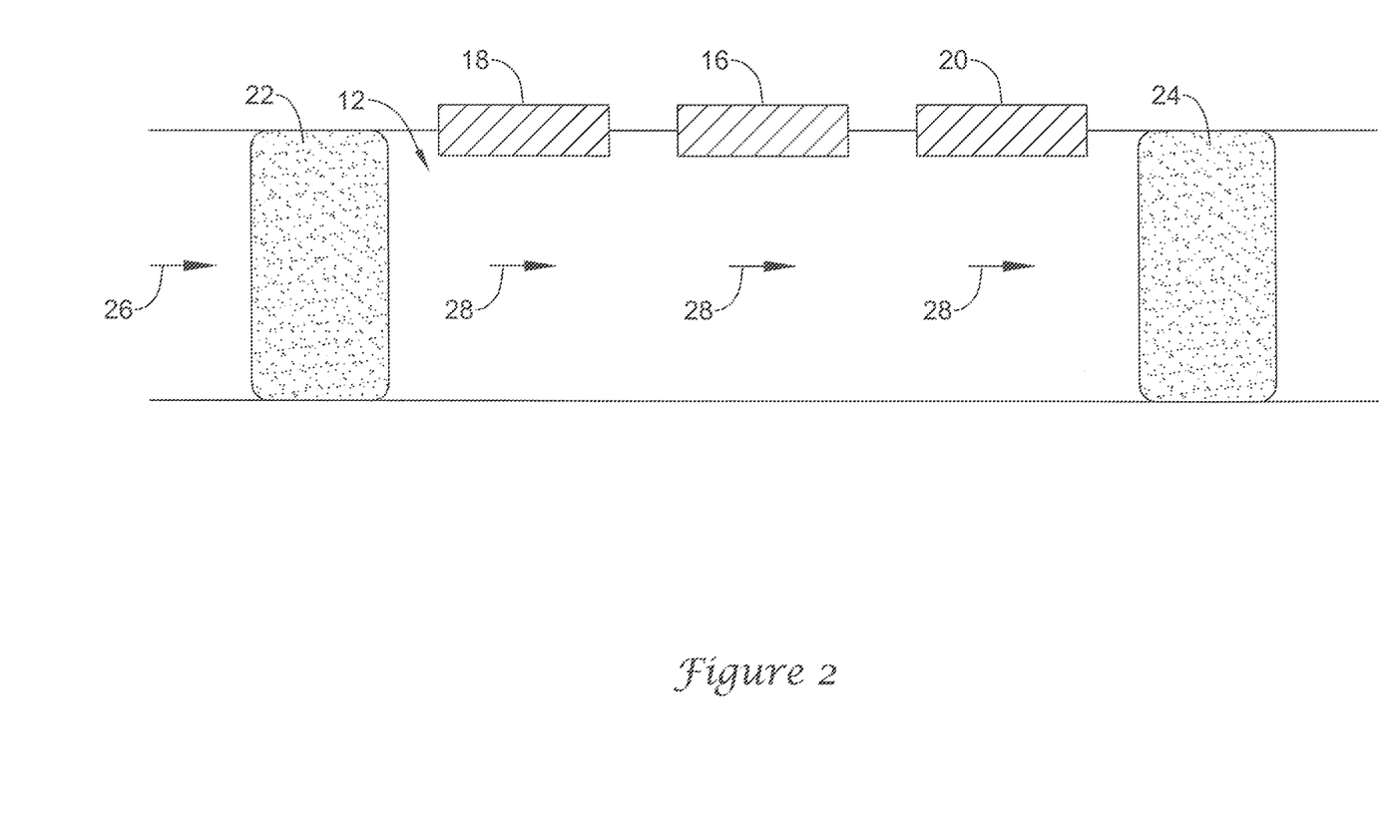
FIG. 2 is a schematic diagram of an illustrative thermal flow sensor assembly useful for measuring the flow rate of a fluid passing through a fluid channel.

FIG. 2 depicts a schematic diagram of an illustrative thermal flow sensor assembly for measuring the flow rate of a fluid flow 28 passing through a fluid channel 12. In the illustrative embodiment, the flow sensor assembly may include one or more heater elements, such as heater element 16, and one or more sensor elements, such as sensor elements 18 and 20, for sensing a flow rate of a fluid 28 in fluid channel 12.

As illustrated in FIG. 2, the flow sensor assembly may also include one or more filter elements or inserts 22, 24 positioned in fluid flow path or fluid channel 12 upstream and/or downstream of heater element 16 and one or more sensor elements 18, 20. Although not required, filter insert(s) 22, 24 may include a plurality of pores and/or other filtering features that may be configured to reduce the turbulence in the fluid passing sensor elements 18, 20 (e.g., flow sensor 10) and through fluid channel 12. In some cases, the filtering features of filter insert(s) 22, 24 may be configured to help laminarize the fluid flow in fluid channel 12 passing the flow sensor, but this is not required.

In some cases, the one or more filter insert(s) 22, 24 may be configured to provide a predetermined pressure drop of the fluid flowing through fluid channel 12 of the housing at a given flow rate, over a predefined range of flow rates, if desired. The predetermined pressure drop caused by fluid flowing through fluid channel 12 at a given flow rate may be predetermined or known from characterizing a fluid flow characteristic of filter insert(s) 22, 24. For example, a predetermined pressure drop caused by fluid flowing through fluid channel 12 at a give flow rate may be predetermined by a known specific acoustic impedance characteristic of filter insert(s) 22, 24 or other fluid flow characteristic of filter insert(s) 22, 24. Such fluid flow characteristic of filter insert(s) 22, 24 may help facilitate a processing element (e.g. processing element 45 of FIGS. 4-6) to provide an accurate pressure or pressure differential within fluid channel 12, based on sensed flow rates of fluid passing through fluid channel 12. In some cases, the filter insert(s) 22, 24 may be configured to help laminarize the flow of the fluid across the flow sensor 10, but this is not required.

Generally, noise, which may affect the linear relationship between fluid flow rate and pressure differential, sensed by a flow sensor may be caused by inconsistencies in features of flow sensor assemblies and such noise may be amplified by the flow of a turbulent fluid flow 26 flowing through fluid channel 12. For example, noise may be caused by irregular molds or inconsistencies in sensor element(s) 10, 18, 20 or other irregularities or characteristics (e.g., friction) of fluid channel 12, which may vary from sensor assembly to sensor assembly and may be amplified by a turbulent fluid flow 26 through fluid channel 12. In some instances, the use of filter insert(s) 22, 24 may result in a more consistently formed flow of fluid passing flow sensor elements(s) 18, 20 in each flow sensor assembly. Further, when filter insert(s) 22, 24 having substantially similar specific acoustic impedances are placed in each fluid channel 12 of a batch or lot of flow sensor assemblies, flows communicating with each flow sensor 10 may have substantially consistent and predictable characteristics.

In some cases, the consistent flow of fluid through filter insert(s) 22, 24 may help cause the flow to become laminar and/or may mitigate turbulent affects of the flow. For example, the laminarizing flow may result in reduced effects on a fluid flow of structural inconsistencies of fluid channels 12 (e.g., noise) within flow sensor assemblies as the fluid passes flow sensor element(s) 10, 18, 20. In some cases, a more laminar flow may reduce the noise sensed by flow sense elements 10, 18, 20 and seen by flow sensor assembly, which may provide a more consistent, reliable, repeatable, and stable output of flow sensor assembly.

As illustrated in FIG. 2, flow sensor assembly 30 may include a heater element 16, a first sensor element 18 positioned upstream of heater element 16, and a second sensor element 20 positioned downstream of heater element 16. While first sensor element 18 is shown as upstream of heater element 16, and second sensor element 20 is shown as downstream of heater element 16, this is not meant to be limiting. It is contemplated that, in some embodiments, fluid channel 12 may be a bi-directional fluid channel such that, in some cases, first sensor element 18 may be downstream of heater element 16 and second sensor element 20 may be upstream of heater element 16. In some instances only one sensor element 18, 20 may be provided, and in other embodiments, three or more sensor elements 18, 20 may be provided. In some instances, both sensor elements 18 and 20 may be positioned upstream (or downstream) of heater element 16.

In some instances, first sensor element 18 and second sensor element 20 may be thermally sensitive resistors that have a relatively large positive or negative temperature coefficient, such that the resistance varies with temperature. In some cases, first and second sensing elements 18, 20 may be thermistors. In some instances, first sensor element 18, second sensor element 20, and any additional sensor elements may be arranged in a Wheatstone bridge configuration, but this is not required in each and every embodiment or any embodiment.

In the example shown in FIG. 2, when no fluid flow is present in fluid channel 12 and heater element 16 is heated to a temperature higher than an ambient temperature of the fluid in fluid flow 28, a temperature distribution may be created and transmitted in a generally symmetrical distribution about heater element 16 to upstream sensor element 18 and downstream sensor element 20. In this example, upstream sensor element 18 and downstream sensor element 20 may sense a same or similar temperature (e.g. within 25 percent, 10 percent, 5 percent, 1 percent, 0.001 percent, etc.). In some cases, this may produce the same or similar output voltage in first sensor element 18 and second sensor element 20.

When fluid flow 28 is present in fluid channel 12 and the heater element 16 is heated to a temperature higher than the ambient temperature of the fluid in fluid flow 28, the symmetrical temperature distribution may be disturbed and the amount of disturbance may be related to the flow rate of fluid flow 28 in fluid channel 12. The flow rate of fluid flow 28 may cause upstream sensor element 18 to sense a relatively cooler temperature than downstream sensor element 20. In other words, the flow rate of fluid flow 28 may cause a temperature differential between upstream sensor element 18 and downstream sensor element 20 that may be related to the flow rate of fluid flow 28 in fluid channel 12. The temperature differential between upstream sensor element 18 and downstream sensor element 20 may result in an output voltage differential between upstream sensor element 18 and downstream sensor element 20, where the output voltage differential may be related to the flow rate of fluid flow 28.

In another illustrative embodiment, the mass flow and/or velocity of fluid flow 28 may be determined by providing a transient elevated temperature condition in heater element 16, which in turn, may cause a transient elevated temperature condition (e.g. heat pulse) in fluid flow 28. When there is a non-zero flow rate in fluid flow 28, upstream sensor element 18 may receive a transient response later than downstream sensor element 20. The flow rate of fluid flow 28 may then be computed using the time lag between upstream sensor element 18 and downstream sensor element 20, or between the time the heater is energized and when the corresponding elevated temperature condition (e.g. heat pulse) is sensed by one of the sensors, such as downstream sensor 20.

Again, as shown in FIG. 2, in addition to sensor elements 16, 18, 20, first and/or second filter elements or inserts 22, 24 may be positioned in fluid channel 12. Illustratively, first filter insert 22 is positioned upstream of heater element 16 and the one or more sensor elements 18, 20, and second filter element or insert 24 is positioned in fluid channel 12 downstream of heater element 16 and the one or more sensor elements 18, 20. In some embodiments, however, it is contemplated that only one filter insert 22, 24 may be provided in fluid channel 12. For example, only filter insert 22 or only filter insert 24 may be provided in fluid channel 12. It is contemplated that only an upstream filter insert may be used, only a downstream filter insert may be used, or that multiple upstream and/or downstream filter inserts may be used, as desired. For example, in a uni-directional sensor, upstream filter insert 22 may serve to produce a controlled pressure drop and/or help laminarize the fluid flow, however, in a bi-directional flow sensor, upstream filter insert 22 and downstream filter insert 24 may serve to produce a controlled pressure drop and/or help laminarize the fluid flow through the flow channel, depending on the direction of the flow.

In the illustrative embodiment, and similar to as discussed above, one or more filter inserts 22, 24 may serve to produce a controlled pressure drop and/or help laminarize the fluid flow through the flow channel. In one example, a relatively unstable or turbulent fluid flow 26 may enter fluid channel 12, and one or more filter inserts 22, 24 may help laminarize fluid flow 28 across heater element 16 and sensor elements 18, 20. Also, the pressure drop caused by the filter inserts 22, 24 may be dependent upon fluid flow characteristics of the filter insert(s). For example, a specific acoustic impedance of filter inserts 22, 24 may produce a controlled or predefined pressure drop across a range of flow rates.

In some embodiments, filter inserts 22, 24 may have a porous structure with pore sizes in the range of microns to millimeters depending on the desired pressure drop, desired range of flow rates and/or other factors, as desired. In some embodiments, filter inserts 22, 24 may have lengths of less than one inch, one inch, or greater than one inch, depending on the desired pressure drop, pore size, and other factors. In some cases, filter inserts 22, 24 may have the same pore size and length and resulting specific acoustic impedance or, in other cases, may have different pore sizes and lengths and other specific acoustic impedances or other dimensions and characteristics (e.g., weight, tensile strength, etc.), as desired.

As a result of dimensional characteristics of filter inserts 22, 24, each filter insert 22, 24 may have a particular specific acoustic impedance, which may be measured in MKS rayls (i.e., 1 pa-s/m) or CGS Acoustic Ohms over 1 $cm^2$ or other known or unknown unit(s) of measurement. Example values of specific acoustic impedances (i.e., specific airflow resistance) in rayls for illustrative filter inserts 22, 24, may include, but are not limited to: 6, 10, 20, 25, 32, 45, 47, 65, 75, 90, 95, 145, 160, 260, 400, 500, or any other value of specific acoustic impedance between 0 and 500 rayls, or greater than 500 rayls in some cases. As referred to above, the specific acoustic impedance of filter inserts 22, 24 may be considered a fluid flow characteristic of filter inserts 22, 24, where that fluid flow characteristic may facilitate creating and/or be indicative of a substantially linear relationship between a measure related to the flow rate of fluid passing through fluid channel 12 and a measure related to the pressure or differential pressure (e.g. pressure drop) caused by the fluid passing through fluid channel 12. In one example, a substantially linear relationship was created by placing a filter insert 22, 24 having an acoustic impedance of 260 rayls upstream of a flow sensor element 10, 18, 20 in a fluid channel 12, creating a linear pressure drop from about 0-556 Pa for flows passing through fluid channel 12 having a flow rate within a flow rate range of 0 to 200 sccm. As used herein, a linear relationship is "substantially" linear if it deviates from an ideal linear relationship by less than 5%.

Once a substantially linear relationship has been developed and/or determined for the measures related to the flow rate of and the pressure or pressure differential caused by a fluid passing through fluid channel 12, these measures may be output from the flow sensor assembly 30 through the use of the processing element (e.g. processing element 45 of FIGS. 4-6) in communication with flow sensor elements 10, 18, 20.

In some embodiments, filter inserts 22, 24 may include suitable filtering materials, such as, for example, hydrophobic materials (e.g., a hydrophobic filter), porous polymer and/or porous fiber material (e.g. sintered polymer particulates), foams (e.g. reticulated foams, open-cell foams), woven fibers (e.g. precision woven mesh), non-woven fibers (e.g. felt), polyurethane, polytetraflouride (PTFE), polyethylene (PE), nylon, polyethylene terephthalate (PET), polybutylene terephthalate (PBT), polypropylene (PP), and/or any other material that, for example, helps laminarize and/or causes a desired pressure drop within fluid channel 12 from a fluid flowing therethrough. The polymer materials may include, for example, thermoset polymers, thermoplastic polymers, elastomer materials, organic or synthetic materials, and any other suitable polymer material, as desired. Example porous materials may include, for example, POREX porous polymer materials and POREX fiber media available from POREX Technologies. Other porous materials are UHMW Polyethylene or PE copolymers available from GenPore. An example of a precision woven mesh is Sefar Tetex ® DLW available from Sefar Filtration Incorporated. An example of non woven fiber material is Gore Acoustic filter GAW102 available from W. L Gore & Associates. Further, filter inserts 22, 24 may be made of any suitable filtering facilitating material (e.g., materials having characteristics consistent with plastic, metal, woven fabrics, etc.) having a desired specific acoustic impedance.

It is to be understood that the heater element 16, flow sensor elements 18, 20 and filter inserts 22, 24 of FIG. 2 are merely illustrative and, in some embodiments, may not be present, as desired. For example, it is contemplated that filter inserts 22, 24 may be incorporated into one or more flow sensors, acoustical sensors, optical sensors, pitot tubes, and/or any other suitable sensor or sensor combination that may be used to sense a measure related to a fluid flow in fluid channel 12, as desired.

Figure 3:
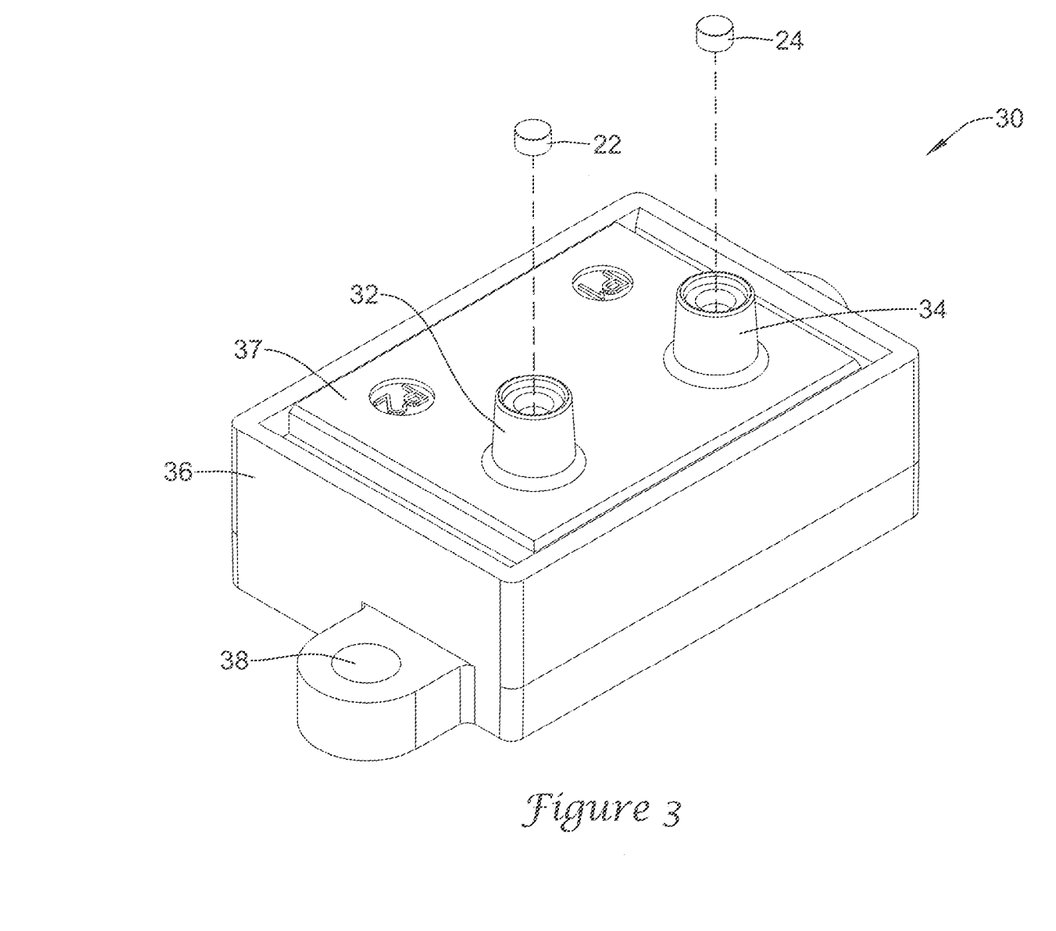
FIG. 3 is a partially exploded perspective view of an illustrative flow sensor assembly that includes one or more filter inserts.

FIG. 3 is a partially exploded perspective view of an illustrative flow sensor assembly 30 that includes one or more filter inserts 22, 24. In the illustrative embodiment, flow sensor assembly 30 includes an outer protective housing including a top protective cover 37 and a bottom protective cover 36. As illustrated, top protective cover 37 may be inserted into a recess of bottom protective cover 36. With such a configuration, top and bottom protective covers 37, 36 may protect flow sensing element (shown as 42 in FIG. 4) and any signal conditioning circuitry such as processing element (shown as 45 in FIG. 4) that may be provided in the housing. In some cases, top protective cover 37 and the bottom protective cover 36 may be formed from, for example, plastic. However, it is contemplated that any other suitable material may be used, as desired.

In the illustrative embodiment, the outer protective housing, including top protective cover 37 and the bottom protective cover 36, may be formed as a composite. However, it is contemplated that the outer protective housing can be molded in a single piece from a plastic or other suitable material according to design considerations. For example, it is contemplated that the outer protective housing may be formed by injection molding or made by other suitable methods and materials, as desired.

Figure 4:
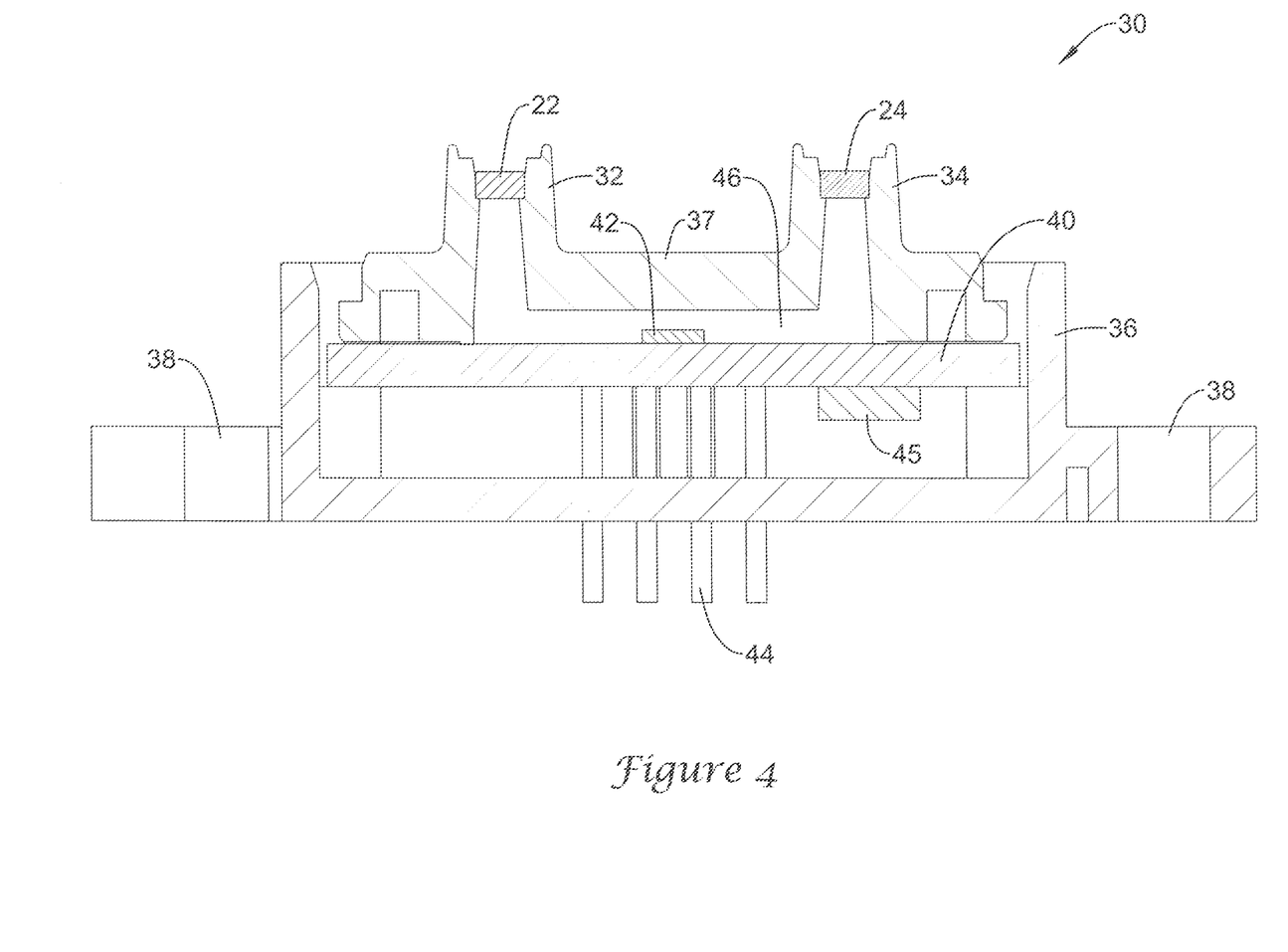
FIG. 4 is a cross-sectional view of the illustrative flow sensor assembly of FIG. 3 including filter inserts in both inlet and outlet flow ports.
Figure 5:
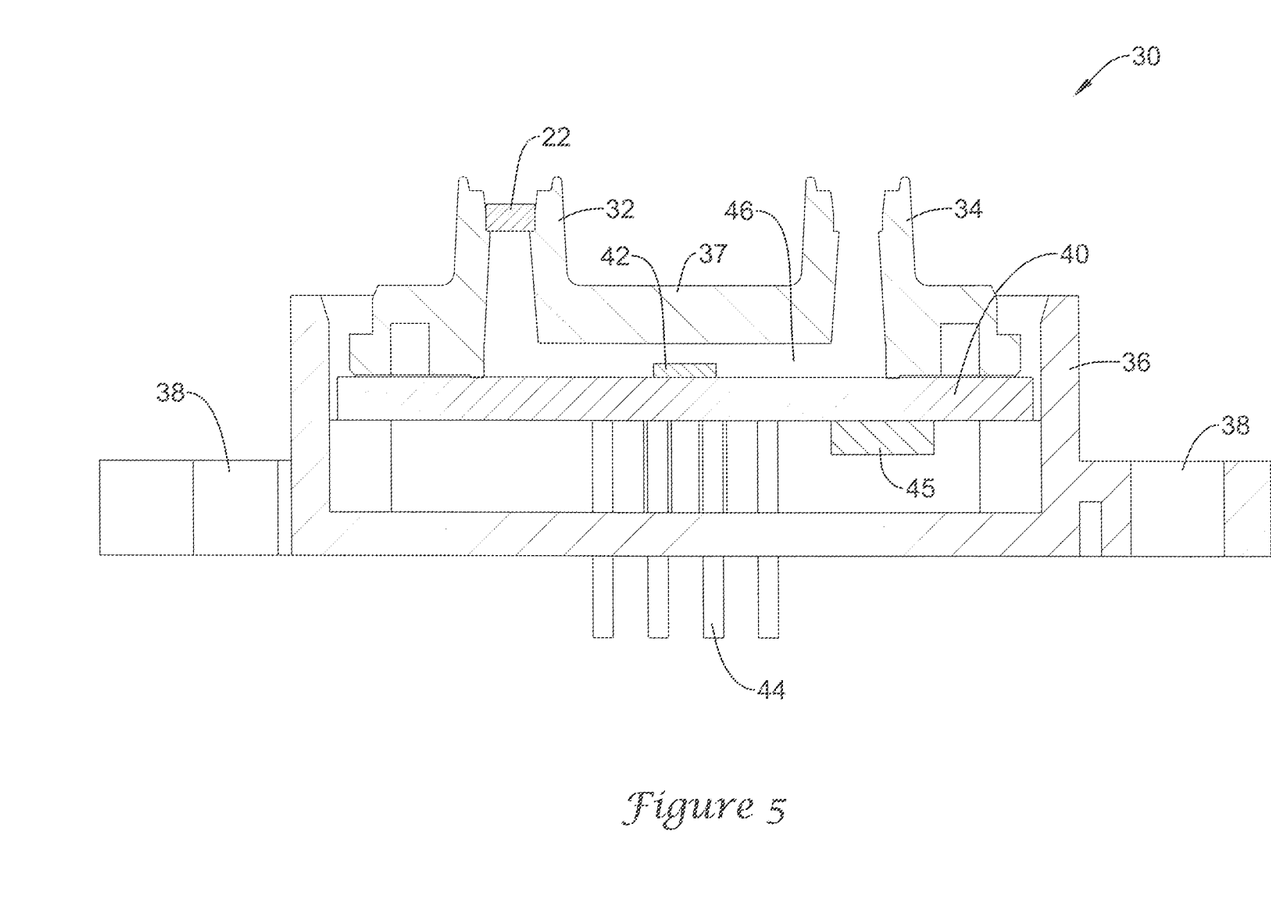
FIGS. 5 and 6 are cross-sectional views of the illustrative flow sensor assembly of FIG. 3 including filter inserts in only one of the inlet and outlet flow ports.
Figure 6:
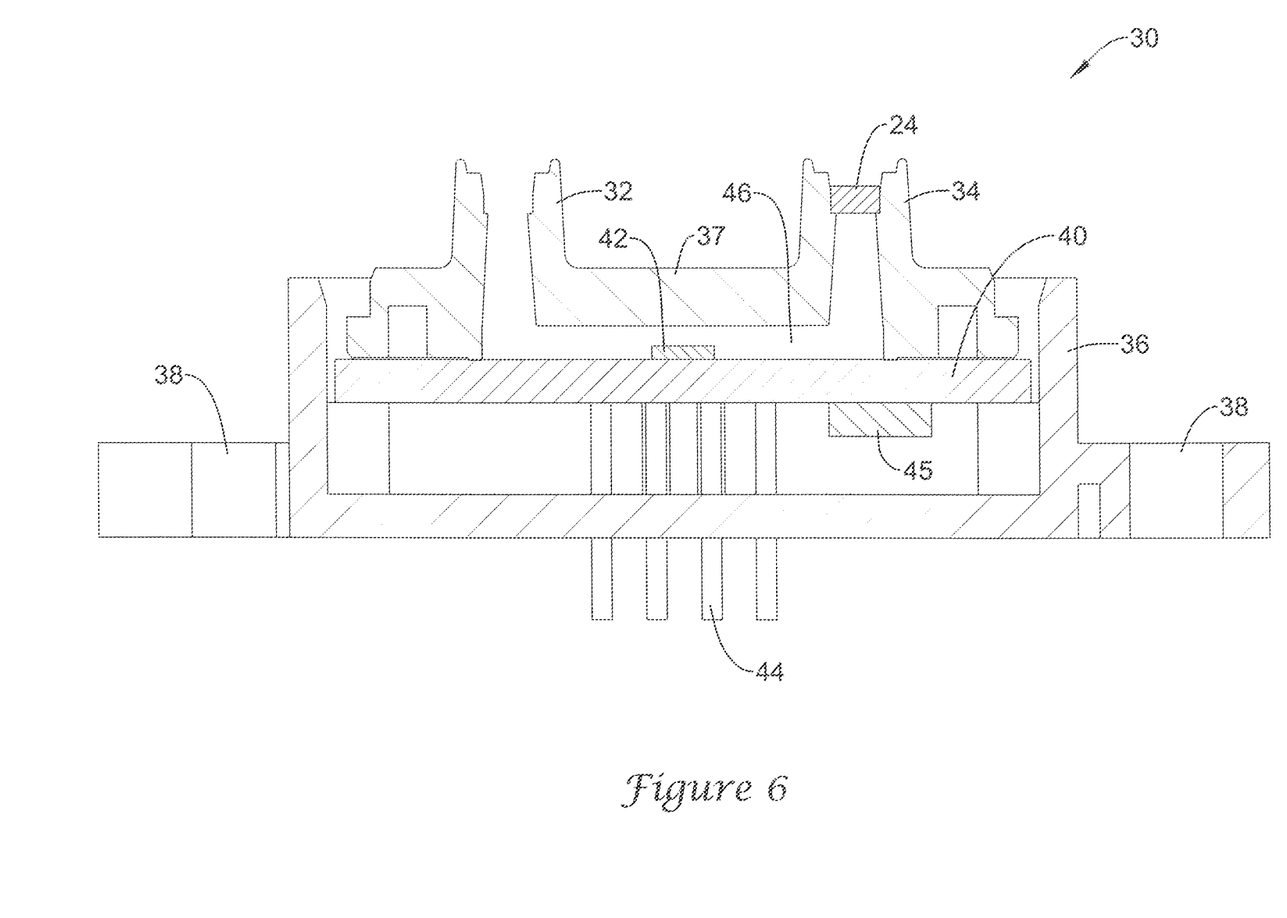

As illustrated in FIGS. 4-6, top protective cover 37 of the housing may include a first flow port 32 and a second flow port 34, with a flow channel 46 (substantially similar to path or fluid channel 12 discussed above) extending therebetween. Flow sensing element 42 (which may comprise any or no combination of features of flow sensor elements 10, 16, 18, 20 discussed above) may be in communication with (e.g. exposed to) the fluid in flow channel 46. In some cases, flow port 32 may be an inlet flow port, and flow port 34 may be an outlet flow port, but this is not required. In some cases, and similar to that discussed above, it is contemplated that flow sensor assembly 30 may be a bi-directional flow sensor assembly and, in such a case, either flow port 32 or flow port 34 may serve as the inlet flow port or the outlet flow port, depending on the direction of the fluid flow through the flow channel.

The flow sensor assembly 30 may include one or more electrical leads 44 electrically connected to the flow sensing element 42 and/or a processing element 45. The one or more electrical leads 44 may extend external of the outer protective housing. In some cases, the one or more electrical leads 44 may include a metal, however, any suitable conducting material may be used, as desired.

In some instances, flow sensor assembly 30 may include a processing element 45 that is electrically connected to one or more electrical leads 44. The processing element 45 may be configured within flow sensor assembly 30 (e.g., on package substrate 40 of FIGS. 4-6) or may be connected and/or attached thereto. The processing element 45 may also be electrically connected to flow sensing element 42, sometimes via traces on package substrate 40 of FIGS. 4-6. In some cases, the processing element 45 may be configured to output a measure related to a flow rate of the fluid flowing through flow path or fluid channel 46 sensed by flow sensor 42. This measure may be output on one or more of the electrical leads 44. Alternatively, or in addition, the processing element 45 may be configured to output a measure that is related to a pressure or differential pressure (e.g. pressure drop) that is produced by the fluid flowing through flow path or fluid channel 12 or flow channel 46 (including one or more of the filter inserts 22 and/or 24), where the measure that is related to the pressure or differential pressure is based, at least in part, on the flow rate sensed by the flow sensing element 42. In the example, the processing element 45 may be any electronic or computing element or elements capable of being configured to compute a second value from a first value. The processing element 45 may include memory and or other electronic features generally associated with a central processing unit or controller, as desired.

In some embodiments, the outer protective housing may also include one or more mounting holes 38. As illustrated, bottom protective housing 36 includes two mounting holes 38, but any suitable number of mounting holes 38 may be used, as desired. Mounting holes 38 may be configured to receive a fastener, such as a screw, bolt, or nail, to mount the bottom protective cover 36 to a desired surface to accommodate the particular equipment for which flow sensor assembly 30 may be used. It is contemplated that bottom protective cover 36 or top protective cover 37 may include additional mounting holes 38 or no mounting holes 38, as desired.

In the illustrative embodiment, first filter insert 22 may be inserted, pressed, or otherwise positioned in or adjacent to inlet flow port 32. Likewise, second filter insert 24 may be inserted, pressed, or otherwise positioned in or adjacent to outlet flow port 34. In some embodiments, filter inserts 22, 24 may be generally cylindrical in shape. However, it is contemplated that any suitable shape may be used, depending, at least in part, on the shape of the port that the insert is to be inserted. In other cases, it is contemplated that filter inserts 22, 24 may be any shape and, when inserted in flow ports 32, 34, filter inserts 22, 24 may be deformable to accommodate the shape of flow ports 32, 34.

As discussed, filter inserts 22, 24 may be configured to have a specific acoustic impedance that will produce a desired, predictable or predetermined pressure drop at a given flow rate through fluid channel 46. Further, it is contemplated that any suitable specific acoustic impedance may be used for filter inserts 22, 24, depending on the desired pressure drop and/or laminarization of the fluid flow in the fluid channel 46. In an illustrative example, where a flow through fluid channel 46 has a flow rate of approximately 200 sccm, an upstream filter insert 22 having a specific acoustic impedance of about 260 rayls may be used to help create approximately a 556 Pa pressure drop within fluid channel 46 at 200 sccm. Also, the flow rate and the pressure and/or pressure drop may be linearly or substantially linearly related at flow rates from 0-200 sccm or more.

In the illustrative embodiments of FIGS. 4-6, flow sensor assembly 30 may include a flow sensing element 42 mounted on a package substrate 40. Flow sensing element 42 may be configured to sense a measure related to flow rate of a fluid flowing through flow channel 46. Package substrate 40 may include a ceramic material, however, other suitable types of material may be used, as desired. Further, package substrate 40 may or may not include a processing element 45, depending on the application.

In the illustrative embodiment, the housing of flow sensor assembly 30 may include top housing cover 37 and bottom housing cover 36. As shown in FIGS. 4-6, top housing cover 37 and bottom housing cover 36 may define a cavity for receiving package substrate 40 which may include flow sensing element 42 mounted thereon. In the illustrative embodiment, an upper surface of package substrate 40, which may include flow sensing element 42, and an inner surface of top housing cover 37 may define flow channel 46 of flow sensor assembly 30. Flow channel 46 may extend from flow port 32 of top housing cover 37, along the flow sensing element 42, and to flow port 34 of top housing cover 37. Flow channel 46 may expose the flow sensing element 42 to a fluid flow.

Flow sensor assembly 30 may include filter insert 22 disposed in or near flow port 32 and/or filter insert 24 disposed in or near flow port 34. As discussed, filter inserts 22, 24 may help laminarize the fluid flow across flow sensing element 42, and/or control the pressure drop along the fluid channel 46. As illustrated in FIGS. 5 and 6, only one filter insert 22, 24 may be utilized in flow sensor assembly 30, if desired. As shown in FIG. 5, filter insert 22 may be provided in or near flow port 32, and there may be no filter insert provided in or near flow port 34. As shown in FIG. 6, filter insert 22, 24 may be provided in or near flow port 34, and there may be no filter insert in or near flow port 32. While only one filter insert 22, 24 is shown in the embodiments of FIGS. 5 and 6, flow sensor assembly 30 may still have a laminar flow and/or a controlled pressure drop with only a single filter insert 22, 24.

While filter inserts 22, 24 are shown inserted into their respective flow ports 32 and 34, this is not meant to be limiting. It is contemplated that filter inserts 22, 24 may be mounted over or provided adjacent to their respective flow ports 32 and 34. Further, it is contemplated that filter inserts 22, 24 may be provided in any suitable position to, for example, provide a controlled pressure drop along fluid channel 46, as desired. In one example, filter inserts 22, 24 may be provided in the flow channel 46 between package substrate 40 and inner surface of top housing cover 37, if desired.

In the illustrative embodiments, flow sensor assembly 30 may include one or more electrical leads 44 mounted to and/or in electrical communication with package substrate 40. One or more electrical leads 44 may be configured to receive one or more signals transmitted from flow sensing element 42 and/or processing element 45 that include: (1) a measure related to a sensed flow rate of a fluid flowing through flow channel 46; and/or (2) a measure related to a pressure or pressure drop along the fluid channel 46. The measure related to a pressure or pressure drop along the fluid channel 46 may be computed based, at least in part, on the measure related to the sensed flow rate of the fluid flowing through the fluid channel 46. In some cases, a transfer function that relates a measure related to the sensed flow rate of the fluid flowing through the fluid channel 46 to a corresponding pressure or pressure drop along the fluid channel 46 may be stored in a memory that is part of or accessible from the processing element 45. With the proper selection of the filter insert, the transfer function may be linear over at least a predefined range of flow rates.

Figure 7:
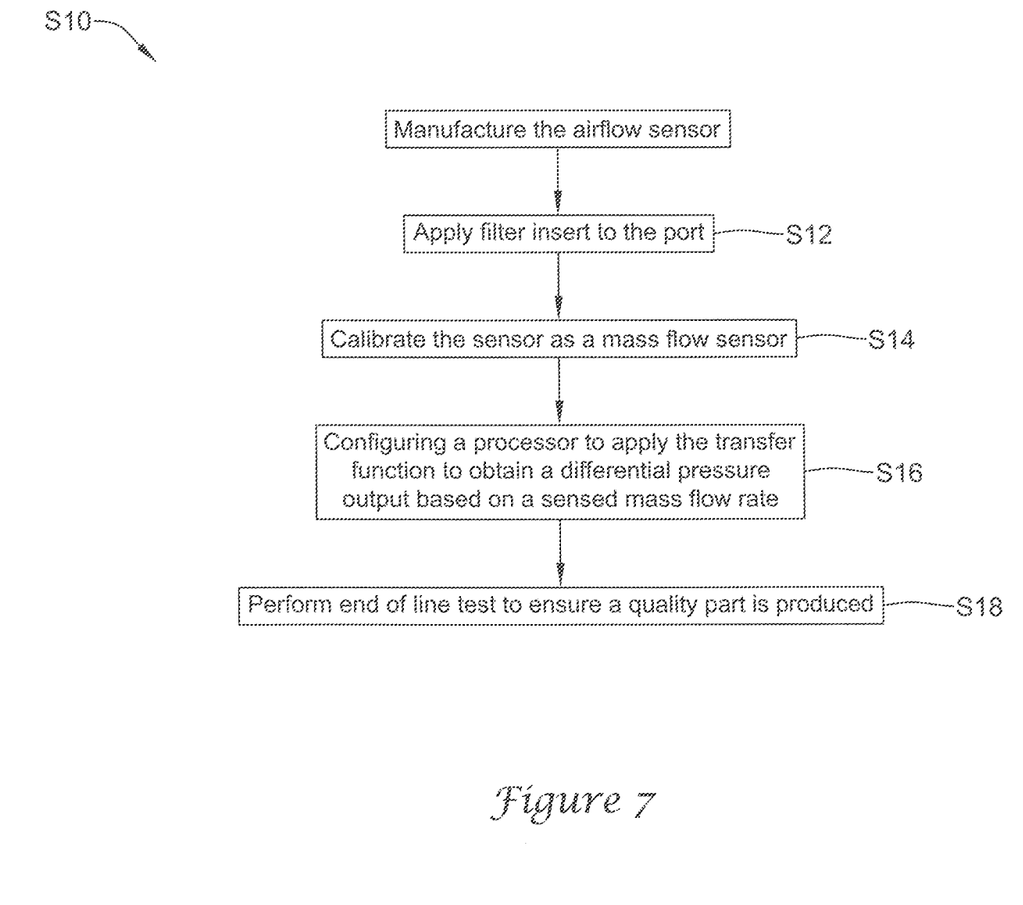
FIG. 7 is a flow chart showing an illustrative method of producing a flow sensor assembly configured to output a measure related to a pressure and/or pressure drop based, at least in part, on a sensed flow rate.

FIG. 7 depicts an illustrative example of steps (S10) showing how to provide a differential pressure and a mass flow rate from a flow sensor assembly 30, where the flow sensor assembly 30 may have a housing with covers 36, 37 that define a fluid flow path or fluid channel 12, 46 including first flow port 32 and second flow port 34 with flow sensor elements 10, 18, 20, 42 positioned within fluid flow channel or fluid path 12, 46 for sensing a flow rate of the fluid passing through fluid flow channel or path 12, 46. An initial step of the illustrative method of outputting a differential pressure and a mass flow rate from a flow sensor assembly may include inserting (S12) a filter insert 22, 24 in or into communication with fluid flow path or fluid channel 12, 46. Illustratively, filter insert 22, 24 may be disposed in fluid flow channel or path 12, 46 at a position upstream of flow sensor elements 10, 18, 20, 42 and adjacent first and/or second input flow port 32, 34. After inserting filter insert 22, 24 in fluid flow path or fluid channel 12, 46, flow sensor elements 10, 18, 20, 42 may be calibrated (S14) as a mass flow sensor for a range of flow rates. Any calibration technique may be utilized to calibrate flow sensor elements 10, 18, 20, 42 over any range of flow rates (e.g., 0-200 sccm, etc.), such that flow sensor 10, 18, 20, 42 may be capable of accurately (+/−5%, +/−1%, +/−0.1%, +/−0.01% or less) reporting a flow rate of a fluid passing through fluid channel 12, 46.

The processing element 45 that may be in communication with flow sensor 10, 18, 20, 42 and may be configured (S16) to output a measure related to a differential pressure produced by the flow passing through inserted filter(s) 22, 24 and the fluid flow path or fluid channel 12, 46, along with being configured to output a measure related to a mass flow rate of the fluid sensed by flow sensor 10, 18, 20, 42. The configuring step may include configuring the processor or processing element 45 to apply a transfer function to the sensed flow rate reported by the flow sensor 10, 18, 20, 42 (and possibly corrected for temperature and/or other factors by processing element 45) to arrive at a measure related to a different pressure caused by the fluid flowing through one or more filter inserts 22,24 and the fluid flow path or fluid channel 12, 46. Illustratively, the applied transfer function may be dependent on one or more fluid flow characteristics (e.g., a specific acoustic impedance, etc.) of filter insert(s) 22, 24 and the flow rate range of the flow sensor assembly, and/or other factors, if desired.

Once one or more filter inserts 22, 24 have been inserted (S12) into flow sensing assembly 30, and flow sensor 10, 18, 20, 42 has been calibrated (S14) and processing element has been configured (S16), flow sensor assembly 30 may accurately output a differential pressure along fluid flow path or fluid channel 12, 46 and/or a flow rate signal. Optionally, prior to outputting a flow rate or differential pressure signal, testing (S18) may be performed on flow sensor assembly 30 to help ensure the assembly outputs accurate measures and is sufficiently reliable. Illustratively, testing (S18) may include outputting a differential pressure and/or a sensed flow rate at one or more particular or predetermined flow rate(s) using a one up tester, and comparing the differential pressure and/or flow rate outputs against predetermined benchmark value(s). If the differential pressure and/or a sensed flow rate differ from the predetermined benchmark value(s) by more than a predetermined amount, the flow sensing assembly 30 may be rejected. Alternatively, or in addition, other similar or dissimilar testing techniques may be utilized.

The process and method of outputting a differential pressure and/or a mass flow rate from a flow sensor assembly (S10) may be applied to a plurality of flow sensor assemblies 30. Where the plurality of flow sensor assemblies 30 may be intended to have consistent, accurate outputs and exchangeable with other flow sensor assemblies 30, process (S10) may be applied to each of the plurality of flow sensor assemblies 30. For example, one of a plurality of filters inserts 22, 24 having substantially the same acoustic impedance may be inserted (S12) in each fluid flow path or fluid channel 12, 46 of flow sensor assemblies 30, each flow sensor element 10, 18, 20, 42 may be configured (S14) as a flow sensor, and the processing element 45 of each of the plurality of flow sensor assemblies 30 may be configured (S16) to output a measure related to a differential pressure and a measure related to a flow rate of a flow passing through fluid flow path or fluid channel 12, 46 of each of the plurality of flow sensor assemblies 30. Following substantially the same process for each flow sensor assembly 30 and using filter inserts 22, 24 of substantially the same acoustic impedance may result in each of the plurality of flow sensor assemblies 30 having substantially the same linear relationship between the measure related to differential pressure and the measure related to the flow rate of fluid flowing through fluid flow path or fluid channel 12, 46, at least over a predetermined range of flow rates.

Further, the substantially common linear relationship between each of the plurality of flow sensor assemblies may be at least partially dependent or based on a fluid flow characteristic of each of the plurality of filters. For example, the characteristic of each of the plurality of filters may be the specific acoustic impedance of each filter, where each filter may have a common or substantially similar acoustic impedance. In addition, one or more of the plurality of assemblies 30 may be tested (S18) by comparing the determined measure related to the differential pressure to a predetermined benchmark value of the measure related to the differential pressure, similar to the testing discussed above, to help ensure quality, consistent and reliable parts are produced and transferred to users and/or end users.

Having thus described the preferred embodiments of the present disclosure, those of skill in the art will readily appreciate that yet other embodiments may be made and used within the scope of the claims hereto attached. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A flow sensor assembly for measuring the flow rate of a fluid over a defined range of flow rates, comprising:
   a housing that defines a flow path that includes an inlet flow port, an outlet flow port, and a fluid channel extending between the inlet flow port and the outlet flow port;
   a flow sensor in communication with the flow path, the flow sensor configured to sense a measure related to a flow rate of a fluid flowing through the flow path over at least the predefined range of flow rates;
   a filter situated in the flow path, the filter having a predetermined acoustic impedance; and
   a processing element in communication with the flow sensor, wherein the processing element is configured to output a measure related to the flow rate of the fluid flowing through the flow path sensed by the flow sensor, and a measure related to a differential pressure produced by the fluid flowing through the flow path, the measure related to the differential pressure is based, at least in part, on the sensed flow rate.

2. The assembly of claim 1, wherein the filter has a fluid flow characteristic such that the measure related to the flow rate and the measure related to the differential pressure are substantially linearly related over the defined range of flow rates.

3. The assembly of claim 2, wherein the fluid flow characteristic of the filter is the acoustic impedance of the filter.

4. The assembly of claim 1, wherein the filter is a porous insert.

5. The assembly of claim 1, wherein the filter is a hydrophobic filter.

6. The assembly of claim 1, wherein the filter includes a first filter element situated upstream of the flow sensor and positioned in the inlet flow port.

7. The assembly of claim 6, wherein the filter includes a second filter element situated downstream of the flow sensor and positioned in the outlet flow port.

8. A flow sensor assembly for measuring the flow rate of a fluid over a defined range of flow rates, comprising:
   a housing that defines a flow path that includes an inlet flow port, an outlet flow port, and a fluid channel extending between the inlet flow port and the outlet flow port;
   a flow sensor in communication with the flow path, the flow sensor configured to sense a measure related to a flow rate of a fluid flowing through the flow path over at least the defined range of flow rates;
   a filter situated in the flow path; and
   a processing element in communication with the flow sensor, wherein the processing element is configured to produce a measure related to the flow rate of the fluid flowing through the flow path sensed by the flow sensor, and to output a measure related to a differential pressure produced by the fluid flowing through the flow path, the measure related to the differential pressure is based, at least in part, on the sensed flow rate; and
   wherein the filter has a fluid flow characteristic such that the measure related to the flow rate and the measure related to the differential pressure are substantially linearly related over the defined range of flow rates.

9. The assembly of claim 8, wherein the fluid flow characteristic of the filter is an acoustic impedance of the filter.

10. The assembly of claim 9, wherein the defined range of flow rates is from 0 to 1,000 sccm, and the acoustic impedance of the filter is in the range from 20 to 500 rayls.

11. The assembly of claim 8, wherein the filter is situated in the flow path upstream of the flow sensor.

12. The assembly of claim 8, wherein the filter includes a first filter element situated in the flow path upstream of the flow sensor, and a second filter element situated in the flow path downstream of the flow sensor.

13. A method of providing a differential pressure and a mass flow rate from a flow sensor assembly having a housing that defines a flow path that includes a first flow port, a second flow port and a fluid channel extending between the first flow port and the second flow port, the flow sensor assembly having a flow sensor positioned in the fluid channel for sensing a flow rate of a flow passing through the fluid channel, the method comprising:
   inserting a filter in the flow path defined by the first flow port, the fluid channel, and the second flow port of the flow sensor assembly;
   calibrating the flow sensor for a range of flow rates; and
   configuring a processing element that is in communication with the flow sensor to output a measure related to a differential pressure produced by the flow passing through the flow path of the housing including the filter.

14. The method of claim 13, wherein the differential pressure is based, at least in part, on the sensed flow rate of the flow passing through the fluid channel.

15. The method of claim 14, further comprising:
   configuring the processing element to output a measure related to the sensed flow rate of the flow passing through the fluid channel; and wherein the filter has fluid flow characteristics such that the measure related to the sensed flow rate and the measure related to the differential pressure have a substantially linear relationship.

16. The method of claim 13, wherein the filter has a fluid flow characteristic such that the measure related to the sensed flow rate and the measure related to the differential pressure have a substantially linear relationship.

17. The method of claim 16, wherein the fluid flow characteristic of the filter is the acoustic impedance of the filter.

18. The method of claim 13, further comprising:
inserting one of a plurality of the filters in the flow path of each of a plurality of flow sensor assemblies; and
configuring the processing element of each of the plurality of flow sensor assemblies to output a measure related to a differential pressure and a measure related to a flow rate of a flow passing through the flow path of each of the plurality of flow sensor assemblies; and
wherein the measure related to the differential pressure and the measure related to the flow rate of each configured processing element has substantially the same linear relationship, which is based, at least in part, on a characteristic of the plurality of filters.

19. The method of claim 18, wherein the fluid flow characteristic of the plurality of filters is an acoustic impedance; and
wherein the acoustic impedance of each filter of the plurality of filters is substantially the same.

20. The method of claim 19, further comprising:
testing one or more of the plurality of flow sensor assemblies and comparing the measure related to the differential pressure to a predetermined benchmark.

* * * * *